Sept. 20, 1966     L. STARCK     3,273,791
CONTROL APPARATUS FOR TYPE SETTING MACHINES
Filed Oct. 28, 1963     4 Sheets-Sheet 1

INVENTOR
Leon Starck
by Michael S. Striker

INVENTOR
Leon Starck
by Michael J. Striker 3,273,791
CONTROL APPARATUS FOR TYPE SETTING
MACHINES
Leon Starck, Frankfurt am Main, Germany, assignor to
Linotype G.m.b.H., Frankfurt am Main, Germany
Filed Oct. 28, 1963, Ser. No. 319,933
Claims priority, application Germany, Oct. 26, 1962,
L 43,294
24 Claims. (Cl. 234—7)

The present invention relates to a control apparatus for a type setting machine or line casting machine, and more particularly to a control apparatus for preventing operations relating to an assembled justifiable composed line before and after the composed line is in a justifiable condition.

In known line casting machines, for example, in Linotype machines, the operator actuates keys corresponding to matrices and space bands in order to cause perforations of corresponding symbols by a perforator on a program tape. At the same time, registering means, for example, a totalizer and an indicator are actuated to register a total of the widths of the matrices and space bands. The indicator means are constructed to indicate at any time during the composing of a line, the total of the already set matrices and minimum widths of the set space bands, as well as the total of the maximum widths of the set space bands. In this manner, the operator can determine the moment in which the line becomes justifiable, and is warned of the moment in which the line is completely full so that an additional matrix would prevent the justification of the line. Each line must be limited to a predetermined length which must not be exceeded.

However, the line casting operation requires great attention of the operator to rules of spelling and punctuation while the progress of the composed lines has to be watched by observation of the indicating means which include several pointers. Since a high composing speed is desired and required from the operators, it happens that the total of the matrices and minimum widths of the space bands exceeds the space available in a line which may be caused by incorrect reading of the indicating means, or by a nondivisible word, started at the end of the line and completed although the indicating means indicated the end of the line.

It is not possible for the line casting machine to cast such incorrectly composed line, and it is necessary to compose two corrected lines for each overfilled line.

It is one object of the present invention to overcome this disadvantage of known type setting or line casting machines, and to provide a control apparatus for preventing the operator from causing a machine operation required for a properly composed line, with an overfilled line.

It is a related object of the present invention to prevent the operator from actuating a key causing a perforator to punch a symbol which is required only for a justified line, when the operator has improperly composed an overfilled line.

Another object of the invention is to prevent the operator from causing a machine operation related to a justifiable line, before the composed line is justifiable.

Another object of the invention is to prevent the operator from actuating keys associated with matrices after composing a line exceeding the length of a justifiable line.

Another object of the invention is to provide a control apparatus for a perforator which automatically the punching of symbols for machine operations with improperly composed lines which are not justifiable to the required standard length of the justified line.

With these objects in view, the present invention relates to a control apparatus for a line casting machine, and more particularly for the perforator by which a program tape controlling a type setting or line casting machine is perforated. One embodiment of the machine comprises operating means, which include a manually operated key, for causing an operation related to an assembled justifiable line composed of matrices and space bands, registering means, such as a totalizer or an indicating means, for registering the total of the widths of all matrices and the widths of all space bands set in a line, and control means controlled by the registering means and preferably including a terminal switch operated by the registering means, to assume a control position when the registering means registers a total of matrix widths and space band widths different from the length of a justified line. In accordance with the present invention, the control means render the operating means inoperative when assuming the control position whereby a machine operation with an unjustifiable line or the recording of a corresponding symbol on a program tape is prevented.

In the preferred embodiment, the operating means are connected to a perforator for causing the punching of a symbol which is required when a justifiable line has been composed. For example, at the end of a composed line, a key lever is operated which controls a mechanical or electrically controlled perforator to punch a symbol into the tape indicating the end of the line. This perforated symbol will, for example, cause the clearing of the indicating means so that the same is ready to indicate the progress of the composition of the next following line. Another key is provided which controls the perforator to punch a perforated symbol which will control an apparatus to transport the assembled line to a position in which a printing slug is cast from the assembled matrices. These key levers form part of the operating means which are rendered inoperative, for example, by mechanically blocking the key levers, when the composed line is not justifiable.

When the key levers control an electric perforator, they open and close key switches, and in order to prevent the actuation of the perforator after a line has been improperly composed, the respective gey switches are automatically disconnected from the perforator so that the perforator cannot punch a symbol.

In one embodiment of the invention, the keys associated with the matrices are also automatically blocked or otherwise rendered inoperative when the operator has composed a line exceeding the length of a justifiable line.

It is advantageous to provide signal means, such as signal lamps or apparatus producing an audible signal, which are automatically actuated to indicate the composition of an unjustifiable line, and preferably also the justifiable condition of the line.

In the preferred embodiment of the invention, the registering means which register the widths of all matrices and space bands have a first position for registering a first total representing the widths of all matrices and the maximum widths of all space bands set in a line, and a second position for registering a second total representing the widths of all matrices and the minimum widths of all space bands set in a line. The control means assume a control position preventing the operation of the operating means when the registering means register a total less than the first total, or greater than the second total. In this manner, operations of the machines on lines which are so incompletely composed that they are not yet justifiable, are also prevented. A composed line which cannot be justified even if the maximum widths of the space bands are used will also cause disturbances in the casting operations. In this embodiment of the invention, the perforator is prevented from punching a symbol representing an operation at the end of a line, if the composed line is not in a justifiable condition, in other words, if more or fewer matrices have been selected by the operator than necessary for the justification of the line.

In the event that too many matrices or space bands have been selected by the operator, the line must be corrected to the proper length before the commands required at the end of a line are given. If too many matrices and space bands have been selected and corresponding symbols punched into the program tape, erasing perforations have to be superimposed on the incorrect perforations which requires a mental calculation by the operator. Before the erasing perforations are made, the automatic blocking arrangement of the invention must be disconnected. However, it is also possible to compose a substitute line. When perforators are used whose totalizer is adapted for subtractions as well as for the standard addition, the total which is too high, can be reduced by subtracting the undesired matrices and space bands until the total is smaller than the maximum total determined by the length of the line. When this total is reached, the blocking of the perforator is automatically released so that a signal representing the end of a proper line can be punched by the perforator.

Evidently, the control apparatus of the invention is not limited to perforators, but recording means which make magnetic recordings for controlling the operations of the type setting machine can be blocked and released in the manner described above for a perforator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

The drawings illustrate only the parts of a standard Linotype machine which are modified and improved by the present invention. The actual structure of a Linotype machine is well known to those skilled in the art from a great number of patents, for example, U.S. Patents 1,968,056, 1,984,317, 2,000,029, 2,024,006, 2,069,240, 2,059,250, and 2,043,231, and from publications of the Mergenthaler Linotype Company, such as "Linotype Machine Principles" published 1940 in Brooklyn, New York.

Figure 1:
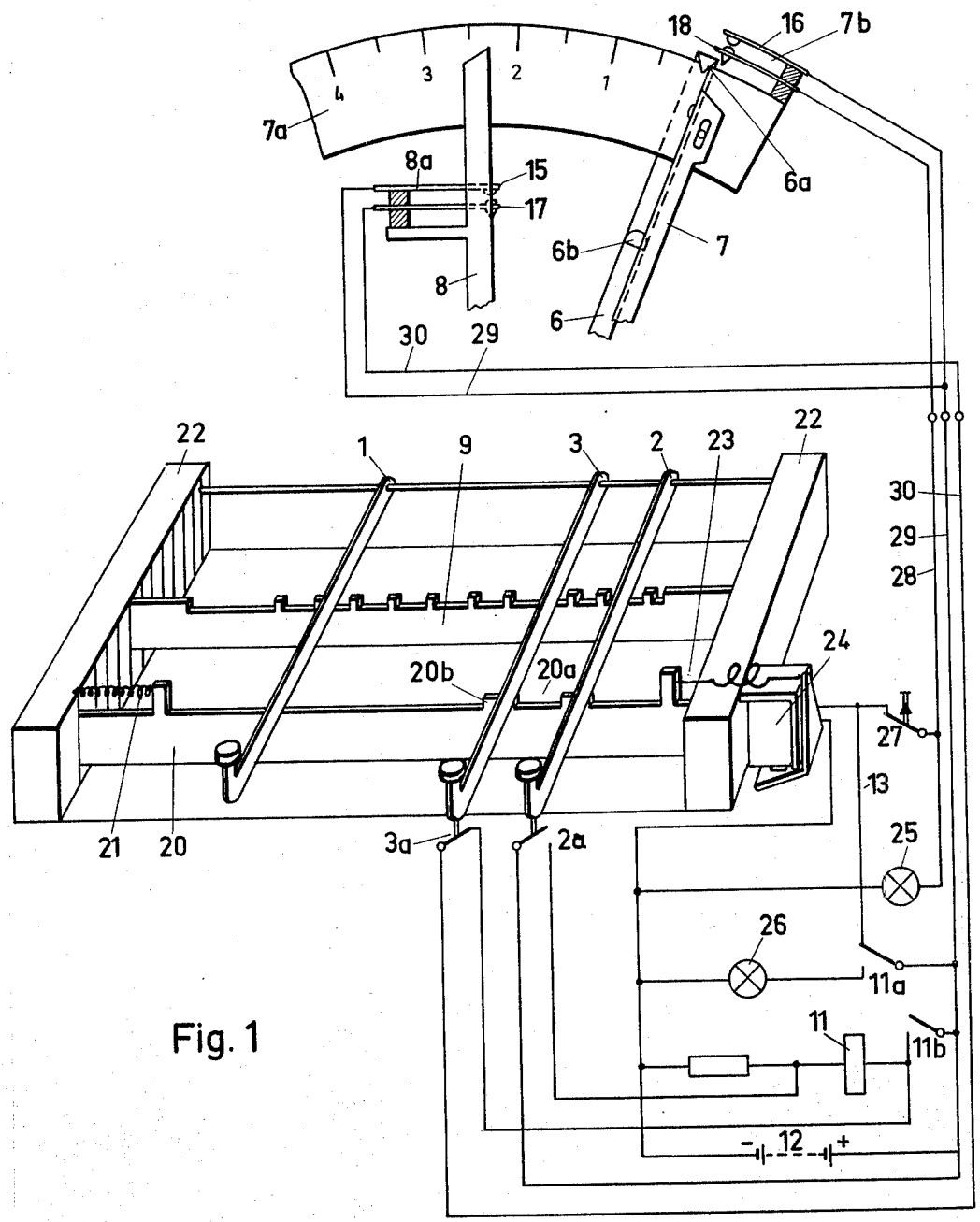
FIG. 1 is partly a perspective schematic view and partly and electric diagram illustrating one embodiment of the invention.

Referring now to the drawings and more particularly to FIG. 1, a plurality of selector key levers 1, of which only one is shown, controls a mechanical perforator, not shown, to perforate in a program tape perforations representing the matrices or space bands. The key board of the machine includes a key lever 3 which causes the punching of a symbol representing the end of a line and, for example, causing the clearing of the totalizer and of the indicator which respond to the widths of the representive selected matrices and space bands. A key lever 2 is provided to control the perforator to punch a symbol which will cause the type setting machine to transport the composed line of matrices and space bands to the casting device where the slug is cast. Key levers 2 and 3 are parts of operating means for causing an operation related to an assembled justifiable line composed of matrices and space bands.

All key levers are mounted between lateral walls 22 of the key board frame, and cooperate with selector bars 9, of which only one is shown, which have projections and recesses to form combinations, as is known to those skilled in the art. The function of bars 9 is not related to the present invention.

Figure 3:
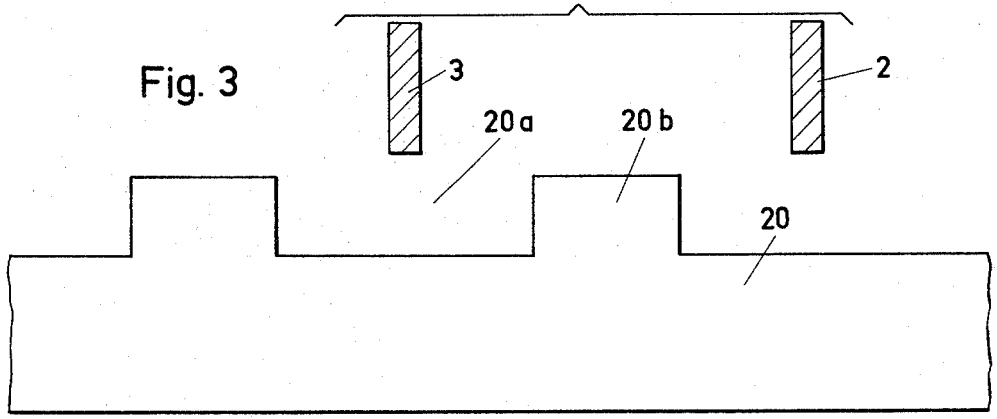
FIG. 3 is a fragmentary front view illustrating on an enlarged scale a detail of the embodiment of FIG. 1.
Figure 4:
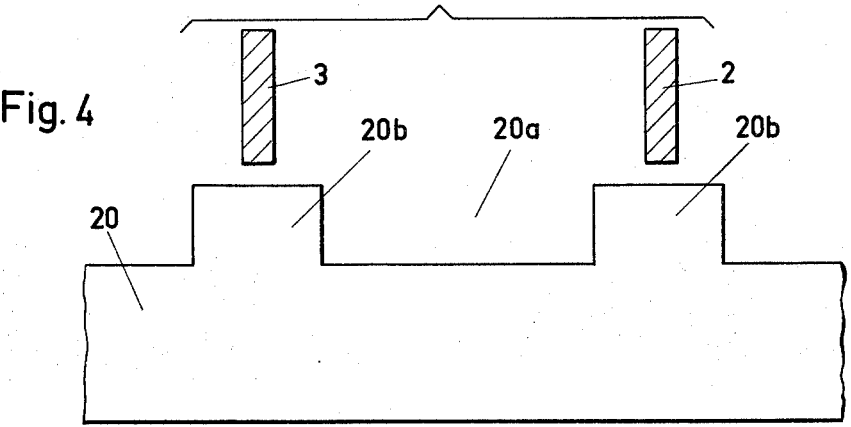
FIG. 4 is a fragmentary view corresponding to FIG. 3 and illustrating another operational position.

A blocking bar 20 is mounted in side walls 22 for longitudinal movement and has recesses 20a and projections 20b, which cooperate with key levers 2 and 3, as best seen in FIGS. 3 and 4. A spring 21 is connected to blocking bar 20 and urges the same to the left as viewed in FIG. 1 to the position shown in FIG. 3 in which key levers 3 and 2 are located opposite recesses 20a, so that key levers 2 and 3 can be operated. The armature of an electromagnetic means 24 is connected by spring 23 to the other end of blocking bar 20 so that upon energization of electromagnetic means 24, blocking bar 20 is shifted to the right as viewed in FIG. 1 to a blocking position shown in FIGS. 1 and 4 in which the projections 20b register with key levers 3 and 2, preventing the actuation of key levers 3 and 2 by the operator. A source of voltage 12 is provided for energizing electromagnetic means 24 and is connected to the same by a contact means 11a controlled by a relay 11. When relay 11 is energized, contact 11a opens and electromagnetic means 24 is de-energized permitting spring 21 to shift blocking bar 20 to the position permitting operation of key levers 2 and 3.

The upper portion of FIG. 1 is a fragmentary front view of a standard indicating means provided in line casting machines. The indicating means is connected to totalizer which counts the widths of matrices and space bands set by operation of keys 1. The indicating means has a dial 7a which is fixedly mounted on a pointer 7 and moves with the same. Pointer 7 is controlled to indicate the total minimum widths of the set space bands and moves to the left. Pointer 8 is controlled to indicate the total of the maximum widths of the set space bands, and also travels to the left. The angular distance beween pointers 7 and 8 represents the so-called space band drive, that is, the expansibility of the space bands. The reading of this value is simplified by the mounting of dial and scale 7a on pointer 7, since pointer 8 indicates the respective value on the moving scale 7a.

A third pointer 6 is controlled to indicate the total of the widths of the set matrices, and travels to the right.

A justification switch 8a including contacts 15 and 17 is mounted on pointer 8, and a terminal switch 7b including contacts 16 and 18 is mounted on pointer 7 and dial 7a. Pointer 6 has a cam projection 6b cooperating with justification switch 8a and bends in the position of FIG. 2 contact spring 17 to close switch 8a. Pointer 6 has a projection 6a cooperating with a contact spring 18 of terminal switch 7b to close switch 7b when pointer 6 moves to the right beyond the tip of pointer 7 and the zero point of scale 7a.

Figure 2:
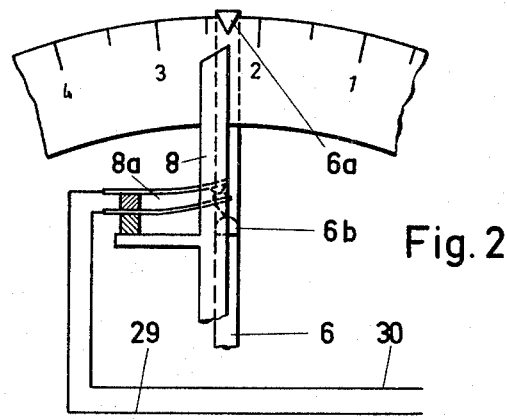
FIG. 2 is a fragmentary front view illustrating a detail of FIG. 1 in another operational position.

At the beginning of the composition of the line, pointer 6 will be on the left of pointer 8 which will be at the right end of the scale 7a aligned in a zero position with pointer 7. As the composition of the line progresses, and selector keys 1 are actuated, pointer 6 will move to the right, and pointers 7 and 8 will move to the left with the angular distance between pointers 7 and 8 increasing as a greater number of space bands is being set. When pointers 6 and 8 substantially coincide, contact 8a is closed, as shown in FIG. 2, and this position of pointers 6 and 8 indicates that the line is justifiable since the total of the widths of the set matrices and of the maximum widths of the space bands will correspond to the length of a justified line, and consequently justification of the set matrices and space bands is possible.

While the operator may terminate the composing of the line at this point by operating key levers 3 and 2, he may continue to compose while pointer 6 moves further to to the right, and pointer 7 moves further to the left until pointers 6 and 7 coincide in the position shown in FIG. 1. The line is still justifiable in this position, since the total of the minimum widths of the space bands and the widths of all set matrices will exactly correspond to the length of a line. When the line is justified, the minimum widths of the space bands will be effective. As explained above, selection of another matrix by operation of a key lever 1 will cause movement of pointer 6 to the right to a position closing terminal switch 7b under whose control the apparatus will automatically prevent operations on the improperly composed line.

Contact 15 of switch 8a and contact 16 of switch 7b are connected to the positive terminal of the voltage source 12 and also to contact means 11a and holding contact means 11b of relay 11. Contact 17 is connected to a switch 3a operated by key lever 3 and connected to relay 11 in series with the same and a resistor which is connected to electromagnetic means 24 and to the negative terminal of the voltage source 12. A switch 2a operated by key lever 2 is connected to the other side of relay 11 and to the positive terminal of voltage source 12.

Contact 18 of terminal switch 7b is connected by a conductor 28 to a signal lamp 25 whose other pole is connected to the negative terminal of the voltage source. Conductor 28 is connected by manually operated switch 27 to electromagnetic means 24. The relay contact means 11a normally connects conductor 29 and the positive terminal of voltage source 12 with the electromagnetic means, but when relay 11 is energized, relay contact means 11a is shifted to a position connecting the signal lamp 26 to the voltage source 12 so that the same is illuminated. A device producing an audible signal may be substituted for signal lamp 26.

The control apparatus illustrated in FIGS. 1 to 4 operates as follows:

At the beginning of a line composing operation, pointer 6 is at left end of the scale and justification switch 8a and terminal switch 7b are open, while key operated switch 3a is closed. Since switch 8a is open, the lines 29 and 30 are interrupted, and disconnect the relay 11 from the voltage source 12. Relay contact means 11a is in the illustrated position so that electromagnetic means 24 is energized and holds the blocking bar 20 in the blocking position shown in FIG. 4 in which key levers 3 and 2 cannot be operated. The operator proceeds to compose the line by actuating selector key levers 1 associated with matrices and space bands. When pointers 6 and 8 travelling toward each other arrive in the position illustrated in FIG. 2, switch 8a is closed by cam projection 6b, and relay 11 is connected to the voltage source 12 through the closed switch 3a. Holding contact 11b closes so that relay 11 remains energized after switch 8a has opened again which will take place when the operator continues to compose the line and pointer 6 travels farther to the right while pointer 8 travels farther to the left if additional space bands are set.

The energized relay 11 shifts relay contact means 11a to a position in which signal lamp 26 is illuminated to indicate that the line is now in a justifiable condition. At the same time, electromagnetic means 24 is disconnected from the voltage source 12 by contact means 11a and spring 21 shifts blocking bar 20 to the left to the position illustrated in FIG. 3 in which key levers 3 and 2 can be operated by the operator. Consequently, after a justifiable condition of the composed line has been reached, as indicated by the coinciding of pointers 6 and 8, the operator can at any time actuate key lever 3 to cause the perforator to punch symbols necessary at the end of the line, for example, the clearing of the totalizer and indicating means under control of key lever 3, and the transport of the line of matrices and space bands to the device where the slug is case under the control of key lever 2.

When key lever 3 is operated, switch 3a is opened, so that relay 11 cannot be energized when pointer 6 momentarily coincides with pointer 8 as pointer 6 moves to the left and pointer 8 moves to the right during the clearing of the indicating means. When key lever 2 is operated, switch 2a is closed, and the winding of relay 11 is short-circuited over the still closed holding contact 11b so that holding contact 11b opens. When holding contact 11b opens, relay 11 is again de-energized, and relay contact 11a returns to the position illustrated in FIG. 1 so that electromagnetic means 24 is again energized and shifts blocking bar 20 to the right to the blocking position shown in FIG. 4 so that the normal condition of the apparatus necessary for the composing of the next following line is again established. This is the normal operation, and the operator may actuate key levers 3 and 2 any time while the pointers move from the position of FIG. 2 to the position of FIG. 1. However, if the operator makes an error, and operates a selector key lever 1 to cause punching of a symbol representing a matrix or space band after the pointers 6 and 7 have assumed the terminal position of FIG. 1, pointer 6 moves farther to the right, and its projection 6a closes terminal switch 7b. Signal lamp 25 lights up to indicate the error of the operator, and since manually operated switch 27 is closed, electromagnetic means 24 is energized and shifts blocking bar 20 to the right to the blocking position preventing actuation of key levers 3 and 2, so that no operation of the perforator is possible whereby no wrong symbol can be punched by the perforator, and so that the incorrectly composed line cannot be transported to the casting device. The apparatus remains blocked until switch 27 is manually opened whereby electromagnetic means 24 is disconnected from the voltage source, permitting spring 21 to shift blocking bar 20 to the left to the releasing position permitting operation of key levers 3 and 2. The totalizer and indicating means are cleared in the conventional manner, and the composed line is either corrected, or replaced by a properly composed line.

In the description of the embodiment of FIG. 1, reference has been made to a perforator operated by key levers 1, 2 and 3. While the use of a perforator for making perforated recordings on a program tape is preferred, it will be understood that other recording means, for example, transducer heads may be used for making magnetic recordings on a magnetic tape which is then used for controlling the type setting machine. In the embodiment of FIG. 1, the recording of a signal under the control of the operating means 3, 2, is prevented not only after the proper length of the line has been exceeded, but also before the composed line is in a justifiable condition. In the simplified arrangement illustrated in FIG. 5, the actuation of operating means 3, 2 is prevented only after the correct length of the line has been exceeded.

The construction of the key board corresponds to the embodiment of FIG. 1, and the blocking bar 20 is again shiftable by electromagnetic means 24 to the right to a blocking position, and by spring 21 to the left to a position permitting the actuation of key levers 3 and 2. Terminal switch 7b has contacts 16 and 18, contact 18 being displaced by projection 6a of pointer 6 when the total of the widths of the composed matrices and minimum widths of the composed space bands exceeds the maximum permissible total corresponding to a full line. Contact 18 is connected by a line 28 to the manually operated switch 27 and to the signal lamp 25, while contact 16 is connected by line 29 to the plus terminal of a voltage source 12 whose negative terminal is connected to the signal lamp 25, and to electromagnetic means 24 which is also connected to switch 27. As long as pointer 6 moves from its initial position located on the left of pointers 7 and 8 to the terminal position, switch 7b remains open and consequently electromagnetic means 24 is de-energized, permitting spring 21 to hold blocking bar 20 in the releasing position corresponding to FIG. 3 in which the operator can at any time operate the key levers 3 and 2. It is assumed that the operator will not actuate key levers 3 and 2 before the justifiable condition of the line is achieved and pointer 6 has traveled beyond pointer 8. While pointer 6 travels between pointers 8 and 7, the operator will actuate key levers 3 and 2 causing the recording or punching of a symbol under whose control the machine will perform an operation required with an assembled justified line. If the operator makes a mistake, and selects an additional matrix by operation of a selector key 1 after the line has been completely filled, pointer 6 will move to a position closing switch 7b so that signal lamp 25 lights up and indicates the error, while electromagnetic means 24 is energized and shifts blocking bar 20 to the right to the blocking position in which actuation of key levers 3 and 2 is not possible. When switch 27 is manually opened, electromagnetic means 24 is de-energized, and spring 21 moves the blocking bar 20 to the releasing position in which the key levers 3 and 2 can be operated. As explained with reference to FIG. 1, the indicating means and the totalizer are cleared, and the line corrected or replaced.

Figure 5:
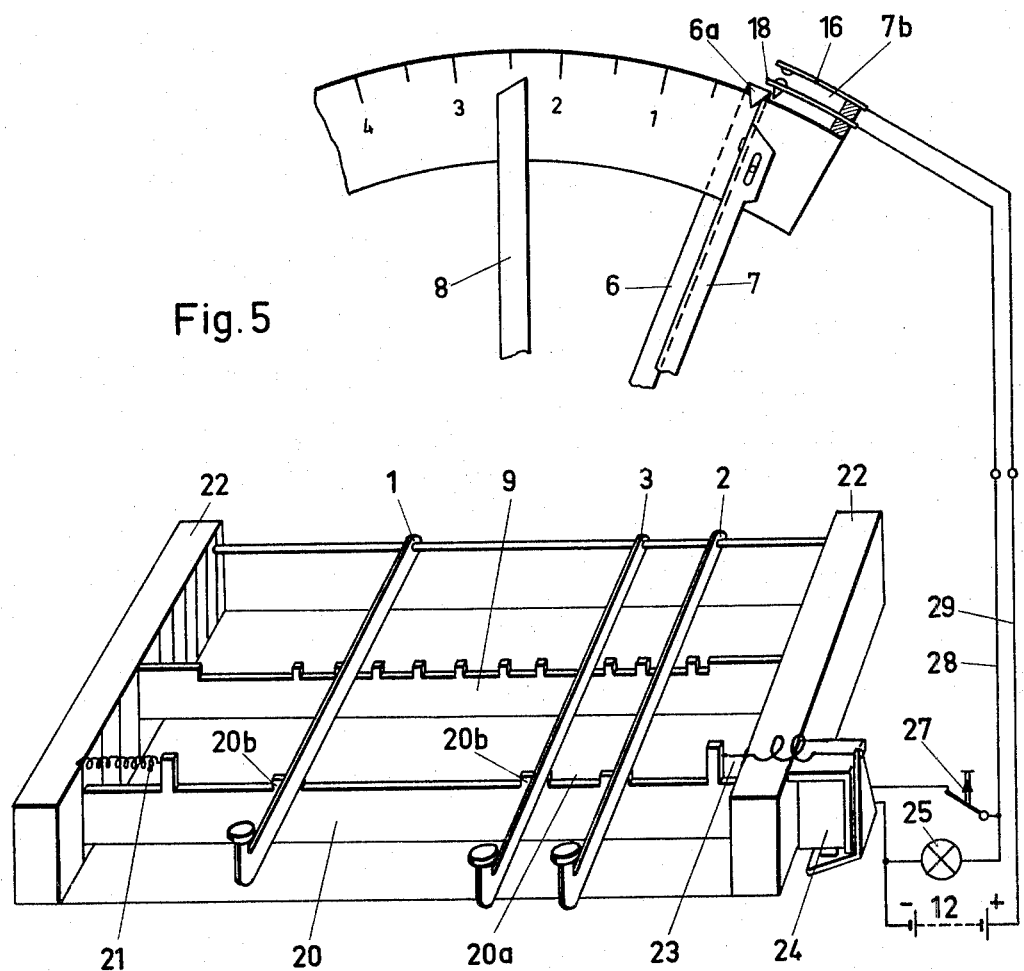
FIG. 5 is partly a fragmentary perspective view, and partly an electric diagram illustrating a simplified embodiment of the invention.

In the embodiment of FIG. 5, as well as in the embodiment of FIG. 1, the operating means shown to be key levers 3 and 2 which cause an operation related to a composed justifiable line, are rendered inoperative when the indicating means indicate a total of matrix width and minimum space band width greater than the length of a correctly justified line.

In the embodiment of FIG. 5, a blocking projection 20b is provided also for each of selector key levers 1, which control the setting of matrices and space bands. Consequently, when the apparatus is in the blocking condition, the key levers 1 are also blocked and the operator cannot cause the punching of additional perforations representing matrices after the line has been completely filled. Corresponding blocking projections may be provided on the blocking bar 20 of the embodiment of FIG. 1, to cooperate with key levers 1.

Figure 6:
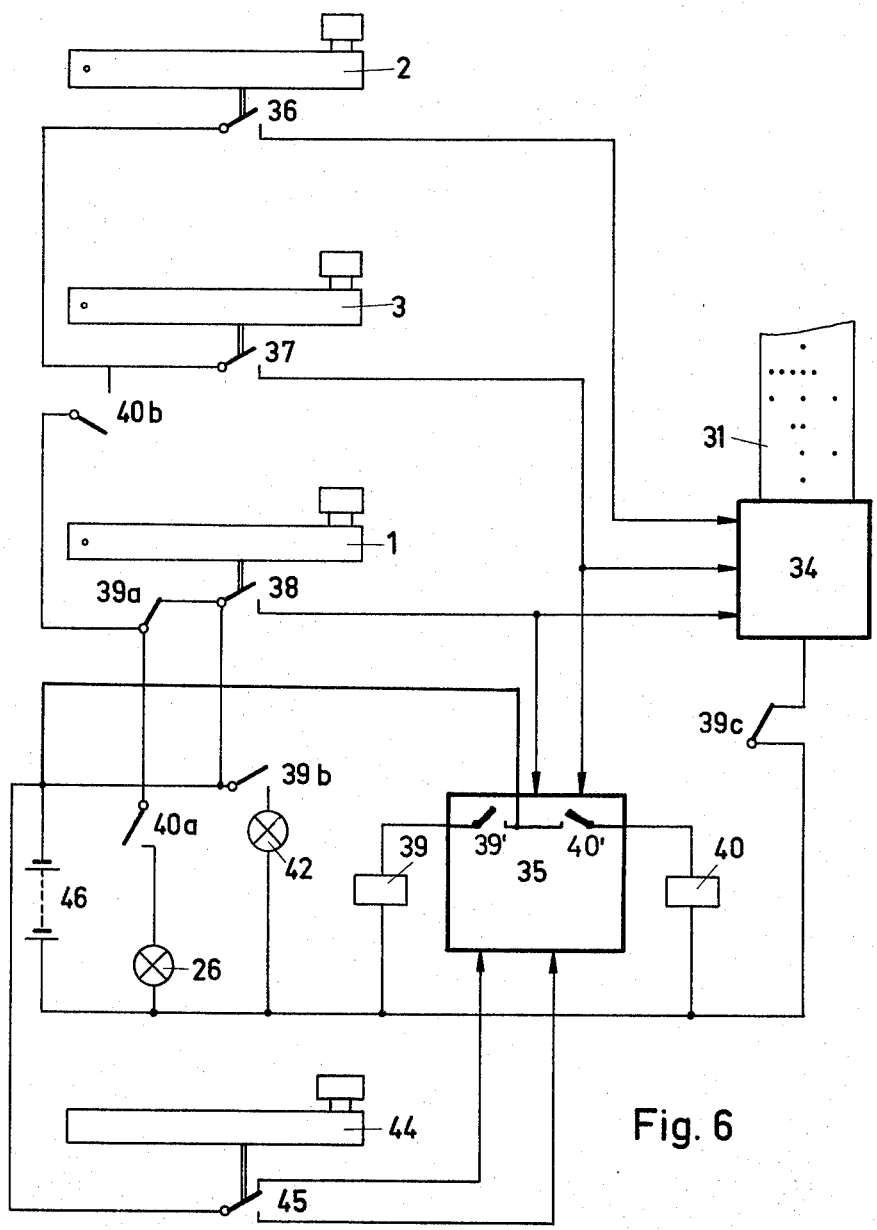
FIG. 6 is a diagrammatic view illustrating another embodiment of the invention.

The embodiment of FIG. 6 is advantageously used in connection with an electrically controlled perforator 34 and a totalizer or counter 35. An indicator corresponding to the indicator described with reference to FIG. 1 is connected to the totalizer 35 but not shown. It will be understood that the indicator of FIG. 5 is also controlled by a totalizer which counts numbers representing the widths of the matrices, and the minimum and maximum widths of the space bands, as the operator actuates key levers 1 to compose the line of selected matrices, and space bands. The totalizer 35 has a first element indicating a first total representing the composed matrices and the minimum width of the composed space bands, and a second element representing the total of the composed matrices and the maximum widths of the composed space bands. The difference between the two totals represents the space band drive which is the expansibility of the space bands.

In the embodiment of FIG. 6, a plurality of selector keys 1, associated with matrices and space bands is provided, only one key 1 being shown in FIG. 6. A key controlled switch 38 is connected to the perforator 34 and to the totalizer 35, and will produce a perforation representing the respective matrix or a space band in the program tape 31, or a corresponding magnetic recording if instead of the perforator a recording apparatus is used. At the same time, numbers representing the width of the respective selected matrix, and the maximum and minimum width of a space band will be entered into totalizer 35 as schematically indicated in FIG. 6 under the control of selector keys 1. The key levers 2 and 3 have the same functions as the key levers 2 and 3 described with reference to FIG. 1. Switch 36 is key-operated to control the perforator to punch a symbol into the tape representing the transportation of the composed line to the casting device. Key 3 controls switch 37 which is connected to the perforator 34 and to the totalizer 35. As explained before, perforator 34 will punch a symbol representing an operation required at the end of a line, while totalizer 35 will be cleared and returned to zero when key operated switch 37 is closed.

A key 44 controls a switch 45 connected by two lines to totalizer 35 and in one position of switch 45 the totalizer will add, whereas in the other position of switch 45 the totalizer will subtract.

Two relays 39 and 40 are controlled by switches 39' and 40' in the totalizer. When the totalizer registers a total representing the widths of the matrices and the minimum widths of the space bands, switch 40' will close. When the totalizer registers a total representing the widths of the composed matrices and the maximum widths of the composed space bands, the terminal switch 39' will close. Closing of switches 39' and 40' will cause energization of relays 39 and 40, respectively, from the voltage source 46.

Relay 39 controls relay contacts 39a and 39b, and relay 40 controls relay contacts 40a and 40b. Closing of relay contact 39b connects a signal lamp 42 into the circuit so that the same lights up, and closing of relay contact 40a connects signal lamp 26 into the circuit. The positive terminal of voltage source 46 is connected to key operated switch 38 and to relay contact 39a which is connected to relay contact 40b. A third relay contact 39c of relay 39 is connected in series with the perforator 34.

The embodiment illustrated in FIG. 6 operates as follows:

By operation of selector keys 1, values representing the widths of matrices and space bands are entered into the totalizer, while corresponding symbols are simultaneously punched by perforator 34 into program tape 31. When a first total is reached representing the composed matrices and the maximum widths of the composed space bands, the justification switch 40' is closed, and relay 40 is energized. Relay contact 40a closes so that signal lamp 26 lights up, indicating to the operator that the line is justifiable. Relay contact 40b also closes so that key operated switches 36 and 37 are connected into the circuit of the voltage source 46, permitting the operator to operate the perforator by actuation of keys 2 and 3 as required at the end of a line. In order to achieve a better appearance of the composed line, the operator will continue to operate selector keys 1 and set additional matrices and space bands. During a normal operation, the operator may at any time after energization of relay 40 and illumination of signal lamp 26, operate the keys 3 and 2 with the associated switches 37 and 36 to effect a clearing of the totalizer and a punching of corresponding symbols into the program tape 31.

However, the operator must not exceed the limit which is a total representing the widths of the matrices and the maximum widths of the composed space bands. When this total is reached in the totalizer 35, the terminal switch 39' is closed, relay 39 energized, and the relay contacts 39a, 39b, and 39c operated. Contact 39c disconnects the perforator so that the same cannot be actuated. Relay contact 39a opens and disconnects key operated switches 36, 37, so that the keys 2 and 3 are rendered inoperative and can no longer control perforator 34 and totalizer 35. Contact 39b closes, and signal lamp 42 lights up indicating the error made by the operator. When switch 45 is shifted by operation of key 44, the counter is reversed, and subtraction of introduced values takes place. In this manner, the totalizer is returned to a position corresponding to a total less than the maximum total at which switch 39' was actuated, and consequently relay 39 is de-energized, and relay contacts 39a, 39b and 39c are shifted, so that correction can be carried out by erasing previously made perforations in program tape 31.

The embodiment of FIG. 6 may be simplified in a manner similar to the embodiment of FIG. 5, by omitting relay 40, justification switch 40', and the relay contacts 40a and 40b. In such a simplified embodiment the operator can operate keys 2 or 3 before the line is justifiable, which would constitute an error. However, it is assumed that the operator will not make this error since this condition takes place only at the beginning of the line where the operator will not yet consider a justification. The relay 39 and corresponding relay contacts will prevent the operator from punching the tape with symbols representing operations which should not be carried out with an improperly composed line.

The totalizer 35 and the indicating means of the embodiments of FIGS. 1 and 5 perform the same function, and constitute registering means for registering at least the total of the widths of all matrices and the minimum widths of all space bands, and preferably also the total representing the widths of all matrices and the maximum widths of all space bands. The several key levers 2, 3, and the elements by which the key levers are connected to recording means, shown to be a perforator, constitute manual operating means. Selector keys 1 constitute selector means for matrices and space bands.

The perforator used in the arrangement of the present invention shown in FIG. 6 corresponds to the perforators disclosed in the copending applications Serial No. 231,187, Serial No. 236,561, Serial No. 250,977, and Serial No. 278,712, and a perforator which can be used in the embodiment of FIG. 6 is also disclosed in the U.S. Patent No. 3,083,897.

It will be understood that each of the elements described above, or two or more together, may also find a useful application in other types of type setting machines, differing from the types described above.

While the invention has been illustrated and described as embodied in a control apparatus for preventing operations concerning incorrectly composed unjustifiable lines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitutes essential characteristics of the generic or specific aspects of this invention and, therefore, such adaptations should and are intended to be comprehended within the meaning and range of equivalence of the following claims.

What is claimed as new and desired to be secured by Letters Patent is:

1. In a line casting machine, in combination, manual operating means including a key and a key switch operated by said key for causing an operation related to a composed justifiable line composed of matrices and space bands; registering means for registering the total of the widths of all matrices and the minimum widths of all space bands set in a line; and control means controlled by said registering means to assume a control position when said registering means registers a total of matrix widths and minimum space band widths greater than the length of a justified line, said control means including a control switch in the circuit of said key switch and disconnecting said key switch in said control position of said control means for rendering said operating means inoperative whereby an operation with an unjustifiable line is prevented.

2. In a line casting machine, in combination, recording means; manual operating means including a key and a key switch operated by said key connected to said recording means for causing the recording of a symbol required at the end of a composed justifiable line composed of matrices and space bands; registering means for registering the total of the widths of all matrices and the minimum widths of all space bands set in a line; and control means controlled by said registering means to assume a control position when said registering means registers a total of matrix widths and minimum space band widths greater than the length of a justified line, said control means including a control switch in the circuit of said key switch and disconnecting said key switch in said control position of said control means for rendering said operating means inoperative whereby an operation with an unjustifiable line is prevented.

3. In a line casting machine, in combination, recording means; manual operating means including a key lever connected to said recording means for causing the recording of a symbol required at the end of a composed justifiable line composed of matrices and space bands; registering means for registering the total of the widths of all matrices and the minimum widths of all space bands set in a line and including indicating means for indicating said total; and control means controlled by said indicating means to assume a control position when said indicating means indicates a total of matrix widths and minimum space band widths greater than the length of a justified line, said control means in said control position including a control switch in the circuit of said key switch and disconnecting said key switch in said control position of said control means for rendering said operating means inoperative whereby an operation with an unjustifiable line is prevented.

4. In a line-casting machine, in combination, recording means; manual operating means including a key and a key switch operated by said key connected to said recording means for causing the recording of a symbol required at the end of a composed justifiable line composed of matrices and space bands; registering means including a totalizer for registering the total of the widths of all matrices and the minimum widths of all space bands set in a line; and control means controlled by said totalizer to assume a control position when said totalizer registers a total of matrix widths and minimum space band widths greater than the length of a justified line, said control means including a control switch in the circuit of said key switch and disconnecting said key switch in said control position of said control means for rendering said operating means inoperative whereby an operation with an unjustifiable line is prevented.

5. In a line casting machine, in combination, a perforator; at least one key lever connected to said perforator for causing the perforation of a symbol required at the end of a composed justifiable line composed of matrices and space bands; indicating means including a pointer means for indicating the total of widths of all matrices and of the minimum widths of all space bands set in a line; and control means including a terminal switch, an electromagnetic means, a blocking means shiftable between an inoperative position and a blocking position blocking movement of said key lever, and circuit means connecting said terminal switch with said electromagnetic means, said terminal switch being disposed so as to be actuated by said pointer means when the same is in a position indicating a total of matrix widths and minimum space band widths greater than the length of a justified line so that the actuated terminal switch controls said electromagnetic means to effect shifting of said blocking means to said blocking position whereby said key lever is prevented from actuating said perforator.

6. A machine as set forth in claim 5 wherein said circuit means includes a signal lamp for indicating the blocked condition of said key lever, and manually operated switch for deenergizing said electromagnetic means.

7. A machine as set forth in claim 5 and including a plurality of other key levers connected to said perforator for causing perforation of symbols related to matrices; wherein said blocking means includes a blocking bar having projections and recesses, and spring means urging said blocking bar to a normal inoperative position in which said recesses register with all said key levers, said electromagnetic means being energized when said terminal switch is actuated by said pointer means so that said blocking bar is shifted to said blocking position, said projections being located in the paths of movement of all said key levers in said blocking position whereby actuation of said perforator by said other key levers is prevented.

8. In a line casting machine, in combination, recording means; manual operating means including a key, a key switch operated by said key, and a circuit connecting said key switch with said recording means for causing the recording of a symbol required at the end of a justifiable line composed of matrices and space bands; registering means for registering the width of all matrices and space bands set in a line, said registering means having a first position for registering a first total representing the widths of all matrices and the maximum widths of all space bands set in a line, and having a second position for registering a second total representing the widths of all matrices and the minimum widths of all space bands set in a line; and control means controlled by said registering means to assume a control position when said registering means registers a total less than said first total or greater than said second total, said control means including a control switch in said circuit of said key switch and for disconnecting said key switch from said perforator in said control position of said control means for rendering said operating means inoperative whereby an operation with an incorrectly composed line is prevented.

9. In a line casting machine, in combination, a perforator; at least one key lever connected to said perforator for causing the perforation of a symbol required for an assembled justifiable line composed of matrices and space bands; indicating means having pointer means for indicating the widths of matrices and space bands set in a line, said pointer means having a first position for indicating a first total representing the widths of all matrices and the maximum widths of all space bands set in a justifiable line, and having a second position for indicating a second total representing the widths of all matrices and the minimum widths of all space bands set in a justifiable line; and control means including a justification switch, a terminal switch, an electromagnetic means, relay means including contacts controlling said electromagnetic means and a holding contact means, blocking means shiftable between an inoperative position and a blocking position blocking movement of said key lever, and circuit means connecting said justification switch and said terminal switch with said relay means, said justification switch being actuated by said pointer means in said first position when the line is justifiable and said terminal switch being actuated by said pointer means when the same moves beyond said second position indicating a total of matrix widths and minimum space band widths greater than the length of a justified line, said holding contact means holding said relay means energized after said justification switch is actuated and before said terminal switch is actuated whereby said electromagnetic means holds said blocking means in said blocking position before said justification switch is actuated and after said terminal switch is actuated whereby said symbol can be perforated only when the composed line is justifiable.

10. A machine as set forth in claim 9, and including a switch connected in series with said relay means and operated by said key lever to disconnect said relay means when said key lever is moved to a position actuating said perforator.

11. In a line-casting machine, in combination, a perforator; at least one key operated switch connected to said perforater for causing the perforation of a symbol required by an assembled justifiable line composed of matrices and space bands; totalizer means for registering the widths of matrices and space bands set in a line, said totalizer means having a first position registering a first total representing the widths of all matrices and the maximum widths of all space bands set in a justifiable line, and having a second position for registering a second total representing the widths of all matrices and the minimum widths of all space bands set in a justifiable line; control means including a first relay energized in said first position of said totalizer and a second relay energized in said second position of said totalizer, said first relay having a first relay contact means in series with said key operated switch and being normally open, said first relay contact means closing when said first relay is energized, and said second relay having a second relay contact means in series with said key operated switch and being normally closed, said second relay contact means opening when said second relay is energized whereby said key switch is required inoperative before said totalizer means registers said first total and after said totalizer means registers said second total whereby said symbol can be perforated only when the composed line is justifiable.

12. A machine as set forth in claim 11 and including a first signal means for indicating said first position of said totalizer and controlled by said first relay, and a second signal means controlled by said second relay, for indicating said second position of said totalizer.

13. A machine as set forth in claim 11 including other key operated switches associated with matrices and space bands connected to said perforator for causing perforation of corresponding perforations and connected to said totalizer to cause registration of matrix widths and space band widths, said first and second relay contact means being connected with said other key operated switches and disconnecting the same from said totalizer and said perforator when said first and second relays are energized, respectively, and a means having two positions reversing said totalizer to add or subtract, respectively, under the control of said other key operated switches.

14. Composing apparatus comprising, in combination, selector means for composing a line of matrices and space bands; operating means for causing an operation permissible only with a justifiable line of matrices and space bands; operating means for causing an operation perfor registering the total of the widths of all selected matrices and space bands; and control means automatically actuated by said registering means to render said operating means inoperative when said registering means register a total of matrix widths and space band widths corresponding to a non-justifiable line whereby an undesired operation with said non-justifiable line is prevented.

15. Composing apparatus according to claim 14 wherein said register means register the minimum width of the selected space bands; and wherein said register means actuates said control means when operated by said selector means to register a total of matrix widths and minimum space band widths exceeding the total of a justifiable line.

16. Composing apparatus according to claim 14 wherein said register means registers a first total of matrix widths and maximum space band widths, and a second total of matrix widths and minimum space band widths, and renders said operating means inoperative before registering said first total and after registering said second total during operation of said selector means.

17. Composing apparatus according to claim 14 wherein said operating means include at least one manually operated key; and wherein said control means include blocking means actuated by said registering means to block movement of said key when said registering means registers a total corresponding to a non-justifiable line.

18. Composing apparatus according to claim 14 including a first switch operated by said operating means for causing said operation; and a second switch in the circuit of said first switch for disconnecting the same when said registering means register a total corresponding a to a non-justifiable line.

19. Composing apparatus according to claim 14 in combination with a line casting machine; and wherein said operating means control said line casting machine and cause said operation in said line casting machine.

20. Composing apparatus according to claim 14 in combination with a perforator adapted to produce coded perforations in a record carrier; and wherein said operating means control said perforator to punch a special coded perforation representing said operation with a justification line so that said special perforation can not be made when said register means renders said operating means inoperative.

21. Composing apparatus according to claim 14 wherein said registering means include a totalizer.

22. Composing apparatus according to claim 14 wherein said registering means include indicating means.

23. Composing apparatus according to claim 14 wherein said registering means include a first switch actuated when said registering means register a first total of matrix widths and maximum space band widths, and a second switch actuated when said registering means registers a second total of matrix widths and minimum space band width; and including an electric circuit connecting said switches with said control means for actuating said control means to render said operating means inoperative before said registering means registers said first total and after the same registers said second total.

24. Composing apparatus according to claim 14 wherein said selector means include selector keys associated with characters and space bands; and wherein said control means render said selector keys inoperative when actuated by said registering means.

References Cited by the Examiner

UNITED STATES PATENTS

| | | |
|---|---|---|
| 1,419,146 | 6/1922 | Kleinshnidt _____ 234—124 |
| 1,769,834 | 7/1930 | Harding. |
| 1,968,059 | 7/1934 | Sylvester et al. _____ 234—7 |
| 2,255,030 | 9/1941 | Tholstrup. |
| 3,112,065 | 11/1963 | Brewer _____ 234—4 |

WILLIAM S. LAWSON, *Primary Examiner.*